Feb. 13, 1934.  E. L. THEARLE  1,947,280
PORTABLE VIBRATION INDICATOR
Filed June 20, 1930

Inventor:
Ernest L. Thearle,
by Charles E. Tullar
His Attorney.

Patented Feb. 13, 1934

1,947,280

UNITED STATES PATENT OFFICE 1,947,280

PORTABLE VIBRATION INDICATOR

Ernest L. Thearle, Schenectady, N. Y., assignor to General Electric Company, a corporation of New York Application June 20, 1930. Serial No. 462,649

6 Claims. (Cl. 73—51)

In the mechanical arts the importance of reducing or eliminating vibration has become more and more apparent. In this connection it is important to have an instrument which will accurately indicate vibratons and the amplitude thereof.

My invention has for its object the provision of an improved portable vibration indicator which is simple in construction and which will indicate the amplitude of vibrations of any given object on a scale and at the same time very greatly magnify the same so that the indications may easily be read with the minimum chance for error on the part of the observer.

For a consideration of what I believe to be novel and my invention, attention is directed to the accompanying description and the claims appended thereto.

Figure 1:
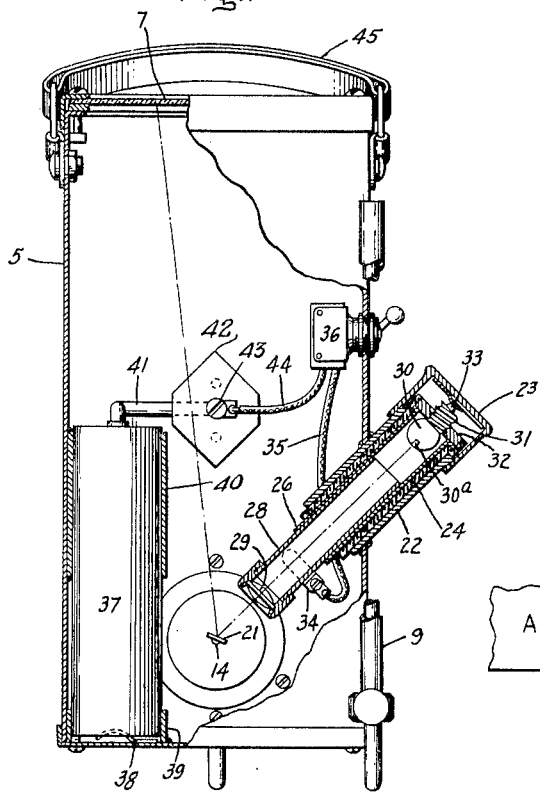
Figure 2:
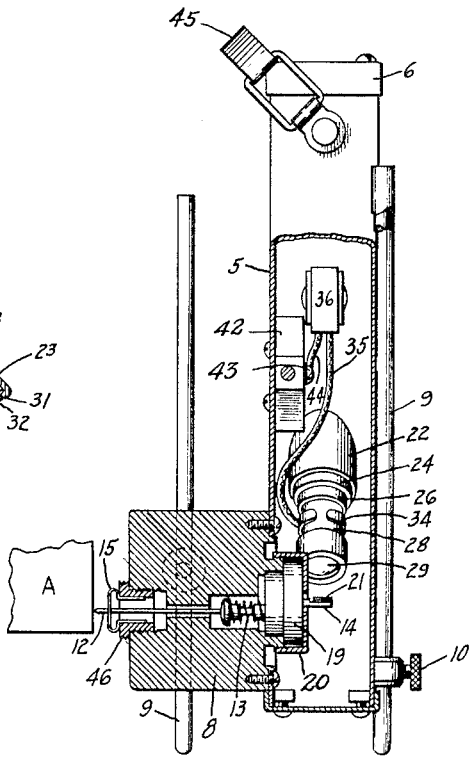
Figure 4:
Figure 3:
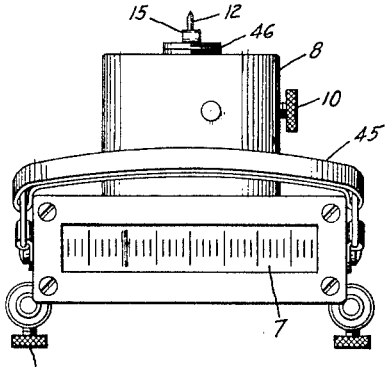

In the drawing which is illustrative of my invention, Fig. 1 is a vertical section of an indicator, Fig. 2 is a vertical cross-section of the same; Fig. 3 is a plan view of the top of the casing; Fig. 4 is a detail sectional view of a cap, and Fig. 5 is a detail view of the means for oscillating the mirror.

5 indicates a rectangular casing or box made of thin metal. The cover 6 of the box is provided with a ground glass or celluloid scale plate 7 upon which are suitably spaced cross-lines, said scale being calibrated for example in terms of thousandths of an inch. The cover is designed to be removable to permit access to the interior of the box. It may be held in place by screws or other securing means.

To the lower end of the box is attached a weight or part of metal 8 which is of substantial mass, and because of this mass and the weight of the associated parts, the box will remain practically stationary when the mirror actuating part of small mass or weight is brought into contact with a body, such as A, the vibrations of which are to be observed. The weight has recesses in two of its opposed surfaces, one to receive a needle and its guide and the other a casing for the mirror operating parts. The box is provided with suitable feet or supports so that the device can rest evenly on a flat surfaced support. For this purpose a three-point support is employed comprising three rods 9 on which the casing or box and its contained parts are vertically adjustable and are secured by clamping screws 10. The weight designated by the part 8 may be made an integral part of the casing, but since it is simpler to make the casing of light sheet metal which may readily be pressed to shape, it is desirable to provide a mass in the form of a separate part as shown. To the relatively heavy part is attached a device which is responsive to vibrations of any given body with which it is brought into contact. The device in the present form of the invention comprises a light, suitably guided needle or small rod 12 which when the device is in use is in contact with the vibrating body and reciprocates longitudinally in response to vibrations, a light spring 13 which presses the needle outwardly against the object and a means for transforming the reciprocating movements of the needle into oscillating movements of the spindle 14.

Figure 5:
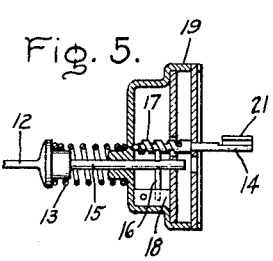

Referring to Fig. 5, 15 indicates a reciprocating member through which extends a small cross pin 16, one end of which enters a long pitch spiral groove 17 in the spindle 14, while the other end of the pin travels in a guide 18. As the member is reciprocated by the action of the body on the needle 12 the pin traveling in the groove causes the spindle to turn about its axis to a greater or less extent, depending on the amount of vibration of the body being examined, the spring 13 acting in opposition thereto. These parts are contained in a suitable casing 19 and the latter is held against a shoulder on the weight or mass 8 by a screw threaded cap 20, Fig. 2, having a central opening through which the spindle 14 extends. On the spindle is mounted a small mirror 21 which oscillates therewith by an amount depending on the vibration of the body or object being examined, said mirror being so mounted as to have one degree of freedom. By mounting the needle and the parts for transmitting its vibratory movements to, and for oscillating the mirror directly on and partly within the weight, the advantage is obtained that the weight is in the most effective position to prevent vibrations of the body A from affecting the casing. Furthermore, the arrangement of said parts tends to simplification of the device as a whole. By locating the light and sensitive parts within the body of the weight said parts are well protected against injury.

Mounted on one side of the box and downwardly inclined is a stationary metal tube 22, the outer end of which has a screw threaded metal cap 23. Inside the tube 22 and insulated therefrom by a lining 24 is a pair of metal tubes 26 and 28 arranged in telescoping relation and adjustable lengthwise one with respect to the other. At the inner end of the lower tube 28 is suitably supported a lens 29 which serves to focus an image of a lamp filament on the mirror 21, from which it is directed to the scale plate. Without such a lens the light reflected by the mirror would spread over a relatively large area instead of being concentrated in a narrow line as is required. 30 indicates a small incandescent lamp bulb of the character commonly used in flashlights. The surface of the bulb is rendered opaque by suitable means such as black paint except for a narrow slit or space 30ᵃ through which only a small portion of the lamp filament is visible. The slit should be so situated that the beam of light passing through the slit 30ᵃ and the lens 29 extends axially of the mirror and spindle 14, the beam at this point appearing in cross section on the mirror as a line of substantial length. This can be done by turning the support of the bulb to the proper position and then clamping it. The lens 29 is so adjusted as to project an image of the lamp filament on the mirror which reflects this image on the ground glass scale plate 7 on which it appears as a sharp bright line. The bulb has a screw threaded metal shell 31 which is supported by a metal disk 32 which is insulated from the outer tube 22 and is in electrical communication with the adjustable inner tubes 26 and 28. The lamp bulb has a center terminal 33 that is in electrical communication with the outer tube 22 and hence with the casing 5 as well. By moving the lower tube in or out the lens 29 can be adjusted with respect to the mirror to obtain the proper concentration of the light beam from the bulb thereon or, in other words, to focus an image of the filament on the scale plate. To the lower tube is attached a spring clamp 34, and this in turn is connected by an insulated flexible wire 35 to the snap switch 36.

In the box in the lower corner opposite the lens 29 is a small dry battery cell 37, one terminal of which is connected by the spring contact 38 to the lower wall of the box. The cell is confined against lateral movement by a socket 39 which is secured to the bottom of the box, and by a band 40 located near the top and which is secured to an end wall of the box. To hold the cell against upward movement a small rod 41 is provided which engages the other terminal of the cell and itself is secured in a block 42 on the back wall of the box by a screw 43. The cell is electrically connected to the switch 36 by the rod 41 and wire 44. The weight of the dry cell also assists in maintaining the box and associated parts in a fixed position when the device is in use.

In order to conveniently carry the instrument about it is provided with a strap or other handle 45 which can be swung to one side to fully expose the scale 7 when in use. By means of the three rods 9 a firm support is provided, and by means of the rods and knurled screws 10 the needle 12 can be raised or lowered with respect to the body being tested.

The needle 12 has a guide 15 near its outer end which is supported by a screw plug 46 carried by the weight 8. The head of the plug is also screw-threaded to receive the cap 47 to protect the needle against injury when the device is not in use.

When the instrument is so placed that the needle 12 is in contact with a vibrating body A, the needle 12, will transmit motion from the body through the associated parts to the mirror 21 and cause the latter to oscillate. The action of the lens and mirror causes a narrow beam of light to be visible on the scale 7 and to move back and forth following the motion of the vibrating body and at the same time greatly multiply the motion. In other words, the distance between the two extreme positions of the beam measured in linear units is a measure of the amplitude of vibration of the body undergoing examination. If the distance from the center of the mirror to the scale is made about eight inches, then a motion of the needle 12 of one-one thousandth of an inch will cause the beam of light on the scale to move one inch. Thus readings of vibration amplitude to one ten-thousandths part of an inch may be observed.

The instrument as thus constructed is exceedingly sensitive. For example, if the instrument is placed on the floor with the needle 12 in contact with the leg of an ordinary desk it will indicate such small vibrations as are caused by a person walking on the floor or if the desk be lightly tapped.

The outstanding advantages of my improved instrument reside in its extreme simplicity, its high magnification, its ability to follow relatively high frequency vibrations, and the fact that it is small, light and portable.

What I claim as new and desire to secure by Letters Patent of the United States, is:

1. A portable vibration indicator comprising a thin walled casing, a relatively massive weight secured to the lower end of a casing wall to hold the casing stationary on a fixed support, a needle extending parallel to the base of the casing and mounted within the weight for longitudinal vibration when brought into direct contact with the body being examined, a guide for the outer end of the needle, a mirror pivotally mounted on the weight for oscillatory movements with one degree of freedom, means located within the weight for converting the longitudinal movements of the needle into oscillatory movements of the mirror, a scale plate mounted on the casing above the mirror upon which a beam of light is projected by the mirror, a lamp supported by the casing at a point above the mirror, and a lens, said mirror and lens focusing an image of the lamp filament on the scale plate.

2. A portable vibration indicator comprising an upright thin walled casing, a relatively massive, hollow weight mounted at the lower end of one of the walls of the casing and projecting outwardly therefrom and of sufficient mass to hold the casing stationary on a fixed support, a needle mounted within the weight for longitudinal movements parallel to the bottom of the casing when the outer exposed end is brought into direct contact with the body being examined, a mirror mounted on the weight at a point inside of the casing for oscillatory vibrations with one degree of freedom, means actuated by the needle for oscillating the mirror, a scale plate carried by the top of the casing upon which a beam of light is directed upwardly by the mirror, a downwardly inclined tube supported by a side wall of the casing, a lens carried by the lower end of the tube, and a lamp bulb carried by the outer end of the tube for directing a beam of light on to the mirror.

3. A portable vibration indicator comprising a thin walled vertically disposed casing, a weight attached to and projecting outwardly from the lower end of one of its walls, said weight having an opening, a needle mounted in the opening and projecting beyond the weight at one end, a mirror, a spindle for oscillatably mounting the mirror on the weight within the casing and extending parallel to the needle, means actuated by the needle for oscillating the mirror, a scale plate forming the top of the casing, a downwardly inclined tube carried by one of the end walls of the casing and extending into it, a lamp carried by the outer end of the tube, and a lens carried by the inner end of the tube for directing a beam of light downwardly on the mirror, said mirror reflecting the beam upwardly on to the scale.

4. In a portable vibration indicator, the combination of a small, relatively light casing, a relatively massive weight associated with the casing and concentrated at one point to hold it stationary in a position adjacent the body to be examined, a needle which is moved longitudinally by the vibrations of the body being examined by direct engagement therewith, a mirror oscillatively mounted, a means for converting longitudinal vibrations of the needle into oscillatory vibrations of the mirror, said needle, mirror and means being directly supported by the weight, a scale plate upon which a beam of light from the mirror is projected, a lamp bulb, and a lens for focusing a beam of light from the bulb on to the mirror.

5. In a portable vibration indicator, the combination of a casing, a weight attached to one of the casing walls, a mirror pivotally supported by the weight, a needle mounted for longitudinal vibration extending outwardly through the weight and adapted to receive vibrating movements of the body being examined, means for converting longitudinal vibratory movements of the needle into oscillatory vibratory movements of the mirror, means for directing a beam of light on to the mirror, a scale plate upon which said beam is reflected by the mirror, and an adjustable support for the casing which permits of its being manually raised and lowered with respect to a given support.

6. In a portable vibration indicator, the combination of a vertically disposed casing, a weight attached to one of the outer walls of the casing near the lower end thereof and having recesses in two of its opposite surfaces, a needle mounted for longitudinal vibration and projecting through the weight from one side, a guide for the needle located in one of the recesses, an oscillating spindle, a mirror mounted on the spindle, means for transmitting reciprocating vibratory movements of the needle and converting them into oscillatory movements of the spindle, a casing mounted in the second of said recesses and supporting the said spindle, mirror transmitting means, and one end of the needle, means for projecting a narrow beam of light on the mirror, and a scale plate carried by the top of the casing to indicate the movements of the beam as reflected on to said scale by the mirror.

ERNEST L. THEARLE.